April 23, 1963 P. R. TUNNICLIFFE 3,086,929
METHOD FOR POISON OVERRIDE IN NUCLEAR REACTORS
Filed March 5, 1958 2 Sheets-Sheet 1
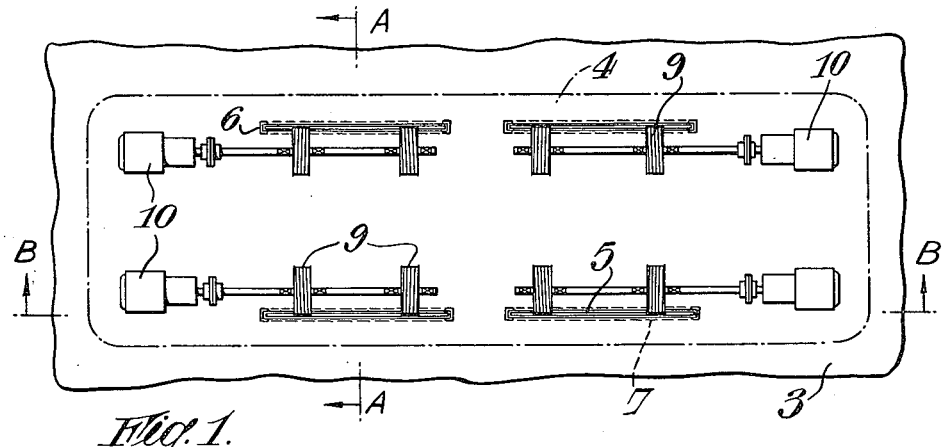
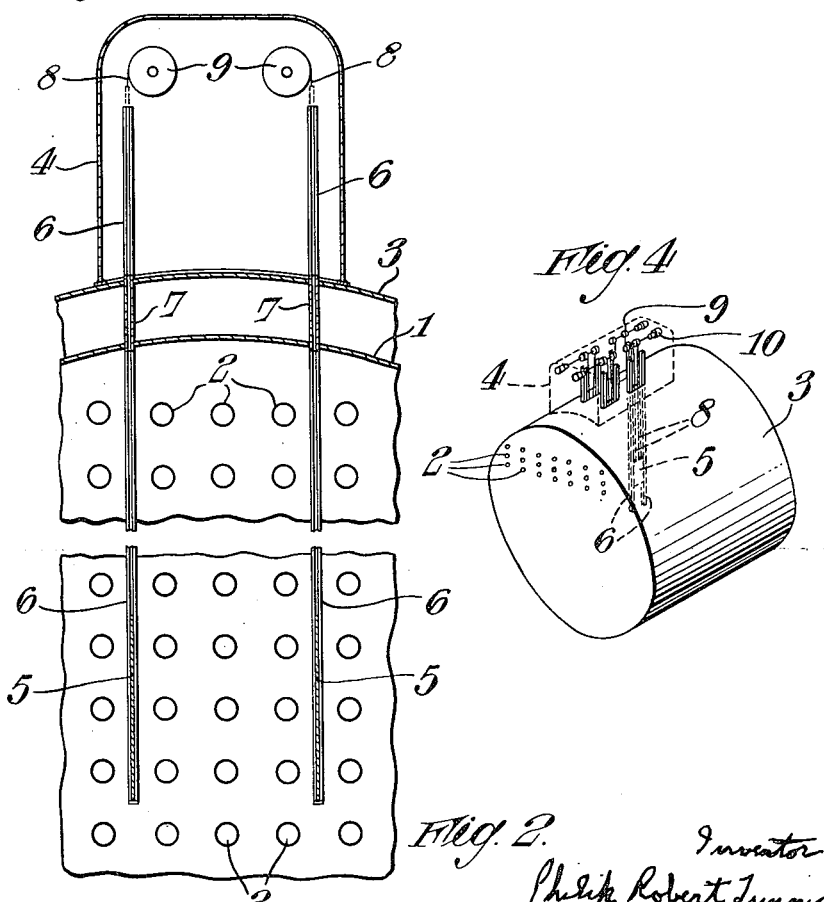

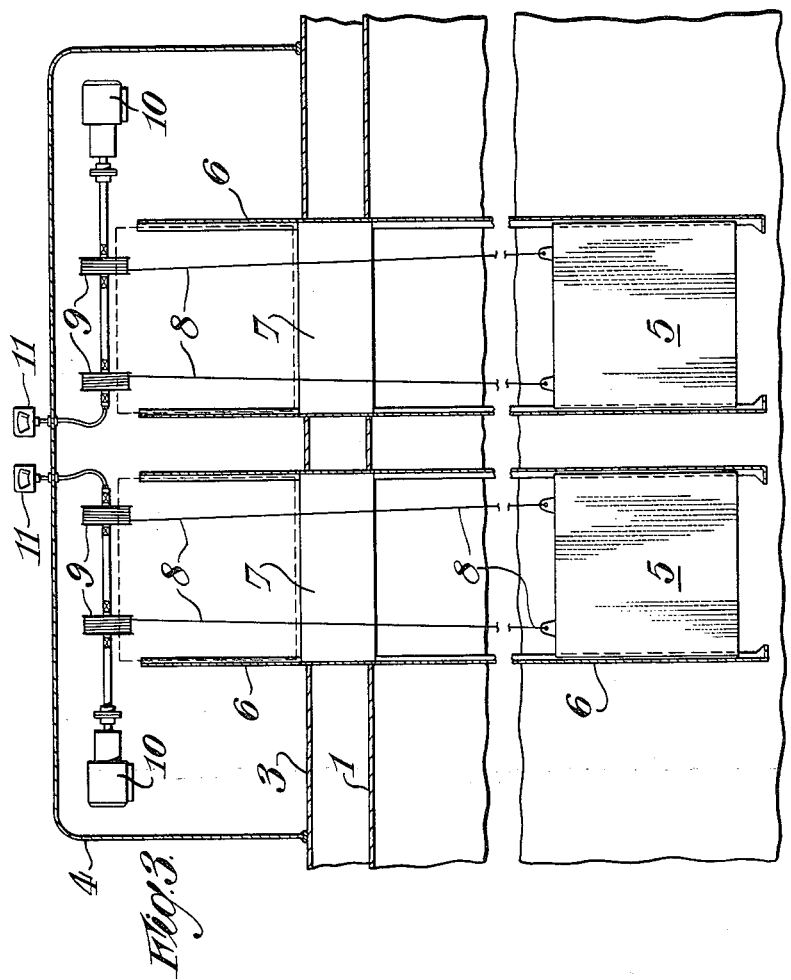

3,086,929
METHOD FOR POISON OVERRIDE IN NUCLEAR REACTORS

Philip Robert Tunnicliffe, Deep River, Ontario, Canada, assignor to Atomic Energy of Canada Limited, Ottawa, Ontario, Canada, a corporation
Filed Mar. 5, 1958, Ser. No. 719,413
5 Claims. (Cl. 204—154.2)

The present invention relates to improvements in the control of heterogeneous thermal atomic power reactors. The invention is especially applicable to such reactors using natural fuel such as natural uranium. The word "natural" is not meant to be rigidly construed and is intended to cover slightly enriched fuels.

The poisoning of heterogeneous thermal atomic reactors by fission products, or daughter nuclides produced by decay of fission products, is a well-known phenomenon. The most important poison is xenon 135 produced by decay of the direct fission product tellurium 135, as follows

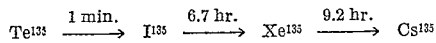

$$Te^{135} \xrightarrow{1 \text{ min.}} I^{135} \xrightarrow{6.7 \text{ hr.}} Xe^{135} \xrightarrow{9.2 \text{ hr.}} Cs^{135}$$

Xenon 135 has an absorption cross section for thermal neutrons of about $3.5 \times 10^6$ barns, much greater than that of any other of the poisons produced.

When the reactor is under operation, the concentration of xenon 135 in the reactor remains at an equilibrium value; the nuclide is being constantly produced but is also being constantly removed mainly as a result of conversion to xenon 136 by absorption of thermal neutrons and to a lesser extent as a result of natural decay. The reactor must have sufficient reactivity in excess of that which would be required in the absence of xenon 135 poisoning to provide the termal neutrons consumed in maintaining this equilibrium value. The consumption of fuel is thus greater than it would be if xenon 135 poisoning did not occur and the cost of the power produced by the reactor is correspondingly increased. However, since xenon 135 poisoning cannot be prevented this loss of economy has to be borne.

The present invention is concerned with a different aspect of xenon 135 poisoning, namely the poisoning which takes place when a reactor is shut down. After shutdown, the removal of xenon 135 as a result of thermal neutron absorption ceases. The iodine 135 which has already been formed from the direct fission product tellurium 135 continues to decay and produce more xenon 135. Since the rate of removal of xenon 135 has decreased, the concentration of xenon 135 begins to increase and continues to do so until it reaches a maximum. After reaching this maximum, at which the rate of production of xenon 135 from iodine 135 is equal to the rate of loss of xenon 135 by decay of xenon 135 to caesium 135, the xenon 135 concentration gradually decreases again. The maximum value may conveniently be referred to as the peak xenon 135 poisoning.

The time interval after reactor shutdown for peak poisoning to be reached is approximately eleven hours and the time interval for the poisoning to decrease from the peak value to a value equivalent to the equilibrium value pertaining during normal reactor operation may be of the order of forty hours. A reactor usually has available reactivity in excess of what is required to maintain criticality and it is only by calling on such reactivity to override the negative reactivity constituted by the excess of xenon 135 over the equilibrium value that the reactor can be restarted. The magnitude of this excess of xenon 135 will depend on the length of time which has elapsed since shutdown, as has been explained, as well as on the design of the reactor and the power level at which the reactor has operated prior to shutdown.

If the reactor does not have sufficient excess reactivity available to overcome the negative reactivity represented by the peak value of poisoning, the reactor can only be restarted either within a short period of time after shutdown but before peak poisoning is reached, or at a time after the peak poisoning has been passed and the poisoning has decreased to a sufficient extent as a result of decay of the xenon 135. In research reactors such a situation, although troublesome, is usually tolerable. The alternative, which is to provide suffifficient excess reactivity to override the peak poisoning value, involves the use of much more fuel and is very expensive; nevertheless it is sometimes employed.

In the case of reactors intended to serve as suppliers of power for commercial purposes it is of much greater importance for the reactors to be capable of being started up, after having been shutdown, as soon as the fault which caused the shutdown has been remedied. To be unable to restart because the reactor has become poisoned to such an extent that the poisoning cannot be overridden by the available excess reactivity means that the reactor may have to stand idle for several days and a power supply system based on such a reactor would be too unreliable.

It is therefore common practice to provide a power reactor with an excess of reactivity which makes possible restarting of the reactor after shutdown. It is uneconomic to provide an available excess of reactivity great enough to allow a restart at any time after shutdown, i.e. even at the peak level of xenon poisoning. Since most of the failures in a power reactor or its associated electrical generating and distributing system can either be remedied fairly quickly or take considerable time (a day or more) it is normally considered adequate if start-up can be achieved within half an hour after shutdown using about 10 milli-k of excess reactivity.

The need to have available a reserve reactivity for overcoming xenon poisoning after shut down impairs the economy of a power reactor. An important feature of this economy is the degree of burn-up of the fuel that can be achieved. The burn-up achieved in a natural or slightly enriched uranium reactor is related to the initial reserve of reactivity. "Burn-up" is usually defined as megawatt days of power produced by each ton of fuel used, i.e. energy per unit mass. Reactivity is lost by two processes: (1) decrease in the net number of fissile atoms (plutonium 239 or uranium 233 may be produced) and (2) accumulation of fission products which capture neutrons.

Because of the complication introduced by the phenomenon of xenon poisoning after shutdown it has been necessary to prevent the reactivity of a thermal power reactor from falling below a minimum value which allows the necessary margin for overriding the xenon poisoning when restarting the reactor. The difference between this minimum value of reactivity and the minimum value that would be permissible if xenon poisoning were not taken into account represents "waste" reactivity, the waste being manifested by the need to discard fuel elements before the end of their theoretically useful life.

The amount of reserve reactivity required to achieve a start-up within half an hour after shutdown may amount to about 10 milli-k of reactivity. To provide a "waste" reactivity of this order by reducing the fuel burn-up (i.e. replacing fuel elements more frequently than would otherwise be necessary) involves considerable expense. For example, it is estimated that to increase the reactivity of the NPG 10 reactor by one milli-k involves an extra annual fuel charge equivalent (at 7% interest) to a capital charge of $5 \times 10^5$ dollars. Thus, making available in the NPG 10 reactor a "waste" reactivity of 10 milli-k by reducing the fuel burn-up introduces an annual expense equivalent to a capital charge of about $5 \times 10^6$ dollars. This expense is, of course, reflected in the cost of the power produced by the reactor.

It will be realized that the feasibility of using atomic reactors to produce power at a cost anything like competitive with that of power conventionally produced hinges on the possibility of eliminating or minimizing the capital and annual costs involved in building atomic reactors. The necessity to choose between a wasteful reactor and an economical reactor which once shutdown may be out of action for several days is a series obstacle to progress towards cheap atomic power.

It is an object of this invention to provide a heterogeneous thermal atomic power reactor with a reserve of available reactivity for overriding the xenon poisoning after shutdown at a much smaller annual charge.

This object is achieved according to the invention by providing a heterogeneous thermal reactor with a standby source of excess reactivity comprising substantially pure fissile material and with means for introducing said substantially pure fissile material into the reactor and means for withdrawing it therefrom.

The term "pure fissile material" is used to mean fissile material, e.g. uranium 235 relatively undiluted by other material of large capture cross section for neutrons, e.g. uranium 238, and the words "substantially pure" should not be narrowly construed. The substantially pure fissile material may be utilized in the form of an alloy thereof with a metal of small neutron capture cross section and having satisfactory corrosion-resisting and mechanical properties, e.g. aluminium, magnesium or zirconium. From such an alloy may be fabricated elements of whatever shape, e.g. as plates, rod or tubes, and size may be best adapted for use in the type of reactor involved.

The substantially pure fissile material, which is preferably pure or nearly pure uranium 235 but may also be, for example, uranium 233 or plutonium 239, is introduced temporarily into the reactor during the period necessary to achieve override of the xenon poisoning. Once the reactor has restarted the substantially pure fissile material can soon be withdrawn since the concentration of xenon 135 is quickly reduced to the equilibrium level by neutron absorption. It is essential that this substantially pure fissile material is withdrawn since it is burnt at a high rate. The cost of the material burnt is such that it can be shown that there is little or no financial advantage in devoting the reactivity gained to increasing the fuel burnup. However, the temporary reactivity gain only requires an investment of the order of $10^3$/milli-k in substantially pure highly fissile material (i.e. of the order of 60 gms. of $U^{235}$ per milli-k), a trivial cost, which will be overshadowed by the cost of the necessary operating mechanisms. Nonetheless, it is estimated that an overall cost of the order of $10^4$/milli-k could be achieved, which is many times less than that which would be required if the necessary reactivity were obtained at the expense of reduced fuel burnup. This represents a negligible contribution to the final cost of the power produced.

The amount of excess reactivity to be provided by the standby source depends on characteristics of the individual reactor. Commonly it is of the order of 10 to 15 milli-k. It may well be higher, depending on the economic limit.

The invention will be described by way of illustration and without limitation with reference to the accompanying drawings in which, FIG. 1 is a plan view of a nuclear reactor, FIG. 2 is a sectional view along the line A—A of FIG. 1, FIG. 3 is a sectional view along the line B—B of FIG. 1, and FIG. 4 is a perspective view of the reactor shown in FIGS. 1, 2 and 3.

The reactor illustrated in the drawings is a heterogeneous thermal reactor using natural or slightly enriched uranium as fuel and heavy water as a moderator. The drawings are merely schematically and do not show all the constructional features but only such as are desirable for describing how the present invention can be put into practice.

The reactor illustrated comprises a reactor vessel 1 in which are disposed a number of fuel tubes 2. A reflector vessel 3 surrounds the reactor vessel 1. The reactor vessel 1 contains heavy water as a moderator, the reactivity of the reactor being controllable by adjustment of the level of the heavy water in the vessel 1. The moderator has to be kept cool and is constantly circulated through a small heat exchanger. Adjustment of the moderator level permits the reactivity of the reactor to be varied up to a maximum value slightly greater than the reactivity required for maintaining steady operation of the reactor; when the fuel reaches equilibrium burn-up the available excess reactivity is a small fraction of one mk (assuming constant charge and discharge) when all the fuel tubes 2 contain fuel elements as they do in normal operation.

The coolant, also heavy water, is circulated through the fuel tubes 2.

Mounted on top of the reactor vessel 1 and sealed thereto is a gas-tight enclosure 4 containing helium under near atmospheric pressure. Inside the enclosure 4 is situated the equipment for controlling a standby reserve of reactivity constituted by four plates 5 composed of an alloy of aluminium and uranium 235 containing approximately 20 mg. of uranium 235 per cm.$^2$. Each of the plates 5 is clad in aluminium. Together the plates 5 represent a source of excess reactivity of 10 milli-k, i.e. 2.5 mk from each plate.

The reserve fuel elements 5 are movable in guides 6 which extend from inside the enclosure 4, by way of a slot 7 through the reflector vessel 3 and the reactor vessel 1 to the middle of the reactor vessel 1. Raising and lowering of the plates 5 in the guides 6 is effected by means of lifting cables 8 secured to the plates 5 and wound on grooved cable drums 9 driven by electric motors 10. Indicating devices 11 are provided for indicating the positions of the plates 5 in the guides 6, these devices being operated by the driving mechanism for the drums 9.

When the reactor is under normal operation the reserve fuel elements 5 are situated entirely within the enclosure 4 and out of the reactor vessel 1 so that they do not contribute to the reactivity of the reactor. If the reactor has to be restarted after shutdown the plates 5 are lowered into the reactor vessel 1 usually right to the bottom of the guides 6 so that the plates are at the centre of the reactor where they exert the maximum effect although if operating experience suggests it to be preferable or if little xenon poisoning is present, they can be lowered to a lesser extent than this. Since the plates 5 are independently operable it is also possible to lower fewer than all four of them if for some reason this is desirable. The necessary cooling of the plates 5 is effected as a result of the plates dipping into the moderator; convection and perhaps some free pool boiling easily removes the heat generated.

The plates 5 are kept inside the reactor vessel 1 until the reactor restarts. They can soon be withdrawn into the enclosure 4 for once the reactor restarts the high neutron flux quickly destroys the excess of xenon 135.

The reserve reactivity constituted by the reserve fuel elements 5 is provided primarily for enabling xenon poisoning to be overridden but it is also capable of being used as an auxiliary means of controlling the reactor. If it is desired to increase the power level at which the reactor is operating the normal procedure in the case of the reactor illustrated would be to raise the level of the moderator in the reactor vessel 1 for a short time until a sufficient rise in neutron density has taken place and then return the moderator to the level at which the multiplication constant $k$ is equal to 1. An alternative to such procedure is to lower the plates 5 into the reactor vessel 1 until the required neutron density has been reached and then withdrawn them.

The invention can profitably be applied to any heterogeneous thermal reactor in which the fuel consumption represents an appreciable fraction of the operating costs. This normally means reactors using natural fuels or slightly enriched natural fuels and fuels which can be classed therewith, e.g. the thorium-uranim 233 fuels.

Arrangements must be made for ensuring that adequate cooling of the elements containing the substantially pure fissile material when the latter is within the reactor. For example, in a reactor using heavy water as a moderator the elements can be immersed in the moderator, as described above.

I claim:

1. In a method of operating a heavy water heterogeneous thermal atomic power reactor which includes starting up, operating, shutting down and restarting the reactor and which includes providing an excess of reactivity in the natural uranium fuel material constituting the core of said reactor, the improvement in the economics of operating said reactor which comprises: operating the reactor with a fuel material selected from the group consisting of natural uranium and slightly enriched natural uranium, the amount of said fuel being sufficient to operate said reactor during normal operation thereof but being insufficient to overcome the effect of xenon poisoning which builds up after said reactor is shut down after a period of operation; shutting down said reactor whereby the xenon poisoning increases above the amount present during said operating step; restarting said shut-down reactor and supplementing the reactivity of said fuel during restarting, by introducing from a gas-tight enclosure mounted on the reactor vessel a reserve fuel element comprising substantially pure fissile material and free from materials of large neutron capture cross-section into said reactor, the amount of said pure fissile material being sufficient to override the increase in xenon poisoning accumulated during shut-down and thereafter once said reactor has been restarted, withdrawing said reserve fuel element of pure fissile material from the reactor and into the said gas-tight enclosure.

2. The method according to claim 1 in which said substantially pure fissile material is substantially pure uranium 235.

3. The method according to claim 1 in which the substantially pure fissile material is plutonium 239.

4. The method according to claim 1 in which the substantially pure fissile material is uranium 233.

5. The method according to claim 1 in which the introduction of the fissile material increases the reactivity of the reactor by an amount up to from 5 to 15 milli-k.

References Cited in the file of this patent

UNITED STATES PATENTS

| | | |
|---|---|---|
| 2,832,732 | Wigner | Apr. 29, 1958 |
| 2,872,399 | Newson | Feb. 3, 1959 |

OTHER REFERENCES

Iskenderian: "Proceedings of the International Conference on the Peaceful Uses of Atomic Energy," vol. 3, pp. 157–168, August 8–20, 1955, United Nations, New York.

AECD–3731, U.S.A.E.C. document dated October 14, 1955, declassified November 10, 1955; pp. 15, 16, 29, 31, 83, 84.